(12) United States Patent
Jantsch et al.

(10) Patent No.: US 8,293,678 B2
(45) Date of Patent: Oct. 23, 2012

(54) METAL FIBERS FOR CATALYST NON-WOVENS

(75) Inventors: Uwe Jantsch, Freigericht (DE); David Francis Lupton, Geinhausen (DE); Harald Manhardt, Hanau (DE); Stefan Vorberg, Hanau (DE)

(73) Assignee: Heraeus Materials Technology GmbH & Co. KG, Hanau (DE)

( * ) Notice: Subject to any disclaimer, the term of this patent is extended or adjusted under 35 U.S.C. 154(b) by 0 days.

(21) Appl. No.: 13/058,373

(22) PCT Filed: Jul. 30, 2009

(86) PCT No.: PCT/EP2009/005521
§ 371 (c)(1),
(2), (4) Date: Feb. 10, 2011

(87) PCT Pub. No.: WO2010/017894
PCT Pub. Date: Feb. 18, 2010

(65) Prior Publication Data
US 2011/0129406 A1   Jun. 2, 2011

(30) Foreign Application Priority Data
Aug. 12, 2008 (DE) .......................... 10 2008 038 611

(51) Int. Cl.
| | |
|---|---|
| C01G 55/00 | (2006.01) |
| B22D 17/00 | (2006.01) |
| C22F 1/14 | (2006.01) |
| B01J 23/38 | (2006.01) |
| B01J 21/02 | (2006.01) |
| C01C 3/02 | (2006.01) |
| C01B 21/38 | (2006.01) |
| B01J 27/185 | (2006.01) |

(52) U.S. Cl. ........ 502/325; 148/538; 148/678; 502/330; 502/339; 502/326; 502/305; 423/376; 423/381; 423/390.1; 423/372

(58) Field of Classification Search .................. 423/402, 423/403, 404, 372, 376, 381, 390.1–394.2; 420/461, 462, 463–468; 502/339, 213, 207, 502/166, 326, 202, 208, 325, 330, 305; 148/430, DIG. 16, 678; 419/4
See application file for complete search history.

(56) References Cited

U.S. PATENT DOCUMENTS

| | | | |
|---|---|---|---|
| 6,089,051 A | 7/2000 | Gorywoda et al. | |
| 6,607,787 B2 | 8/2003 | Kock et al. | |

FOREIGN PATENT DOCUMENTS

| | | |
|---|---|---|
| DE | 3136303 A1 | 4/1983 |
| DE | 197 12 625 A1 | 10/1998 |
| DE | 19757093 A1 | 7/1999 |
| DE | 199 45 742 C1 | 10/2000 |
| DE | 100 00 097 A1 | 7/2001 |
| DE | 100 40 591 C1 | 11/2001 |
| EP | 0 364 153 A1 | 4/1990 |
| EP | 0 606 535 A1 | 7/1994 |
| GB | 2 273 716 A | 6/1994 |
| JP | 08-013064 A | 1/1996 |

OTHER PUBLICATIONS

English Machine Translation of JP 08013064 A.*
Office Action issued Jan. 18, 2012 in SA Application No. 109300509.
Int'l Search Report and Written Opinion issued on Mar. 30, 2010 in Int'l Application No. PCT/EP2009/005521.

* cited by examiner

*Primary Examiner* — Steven Bos
*Assistant Examiner* — Justin Bova
(74) *Attorney, Agent, or Firm* — Panitch Schwarze Belisario & Nadel LLP

(57) ABSTRACT

A metal fiber based on one or several elements from the group of platinum, palladium, rhodium, ruthenium, and iridium with 0 to 30% by weight of one or several additional alloy elements from the group of nickel, cobalt, gold, rhenium, molybdenum, and tungsten, contains 1 to 500 ppm by weight of boron or phosphorus. A non-woven material or netting, in particular for the production of nitrogen oxide or for the production of hydrocyanic acid, is made of such fibers. For the production of fibers based on noble metals having up to 30% by weight of additional alloy metals by drawing the fibers from a melt, the melting point of the metal is reduced by at least 400 ° C., before drawing of the fibers, by additionally alloying with boron or phosphorus, and the boron or the phosphorus is removed again from the fibers.

3 Claims, No Drawings

METAL FIBERS FOR CATALYST NON-WOVENS

CROSS-REFERENCE TO RELATED APPLICATIONS

This application is a Section 371 of International Application No. PCT/EP2009/005521, filed Jul. 30, 2009, which was published in the German language on Feb. 18, 2010, under International Publication No. WO 2010/017894 A2 and the disclosure of which is incorporated herein by reference.

BACKGROUND OF THE INVENTION

The present invention relates to catalyst structures for the production of nitric acid and hydrocyanic acid, to metal fibers based on noble metals and suitable for the production of catalysts, to netting and non-wovens made therefrom, and to processes for the production of such fibers, non-wovens and nettings.

German Patent DE 199 45 742 C1 discloses a metal fiber catalyst body, the metal fibers of which are produced by melt extraction. Using textile techniques, non-woven fabrics, among others, are produced from the fibers. The catalyst material platinum, palladium rhodium is contained in the fibers or present in the woven material as additional fibers.

German published patent application DE 100 00 097 A1 discloses melt extraction processes for metal fiber production from thin fibers with diameters of less than 100 μm using melt bath temperatures of up to above 1500° C.

German published patent application DE 197 12 625 A1 describes a process in which metallic fibers, among others, are deposited through the meshes of a distributing roller onto a moving substrate and joined together at intersection points.

These processes seem to be unsuitable or at least difficult to implement for the production of metal fibers and nettings or non-wovens produced therefrom in the case of metals with a high melting point.

German Patent DE 100 40 591 C1 teaches the method of alloying platinum, iridium, rhodium and ruthenium, among others, with boron and phosphorus.

The efficiency of known catalysts, in particular platinum-rhodium catalysts, decreases over time.

BRIEF SUMMARY OF THE INVENTION

It is the object of the present invention to produce fibers, netting or non-wovens based on noble metals. The process should be as simple as possible. The catalysts should retain a high level of efficiency in the long term.

To achieve this object, the melting point of a metal is drastically reduced by boron or phosphorus before processing the fibers, and the boron or phosphorus is largely removed subsequent to the production of fibers or non-wovens or nettings produced from the fibers.

The object is further achieved by a non-woven material or netting comprising metal fibers based on one or more elements from the group of platinum, palladium, rhodium, ruthenium, and iridium with 0 to 30% by weight of one or more additional alloy elements from the group of nickel, cobalt, gold, rhenium, molybdenum, and tungsten, wherein the metal fibers contain 1 to 500 ppm by weight of boron or phosphorus.

Still further, the object is achieved by a process for the production of fibers based on noble metals with up to 30% by weight of additional alloy metals by drawing the fibers from a melt, wherein the melting point of the metal is reduced by at least 400° C. before drawing the fibers by additionally alloying with boron or phosphorus, and the boron or the phosphorus is removed again from the fibers, and wherein the fibers are sintered to form a non-woven material or netting.

It is assumed that the surface roughness of the fibers is increased during the removal of the boron and/or phosphorus and that the effectiveness of the catalyst is increased simultaneously with this additional porosity. In addition, it is suspected that boron or phosphorus hampers the formation of oxides, which are catalytically ineffective and block access to the catalyst.

According to the invention, the melting point of a metal based on noble metal, in particular based on metals of the platinum group metals, such as platinum, palladium, rhodium, ruthenium, and iridium, and, if necessary, additional alloy elements of up to 30% by weight in total of the metals nickel, cobalt, gold, rhenium, molybdenum and tungsten, is reduced substantially, in particular by at least 400° C., preferably by at least 500° C., by boron or phosphorus. For this purpose, eutectic compositions are preferably produced with boron or phosphorus. Such eutectic mixtures are generally situated between 1 to 5% by weight of boron or phosphorus, based on the metal to be processed.

It is still feasible to carry out the present invention if the mixture is not eutectic. However, the effect becomes unusable below 0.5% by weight of boron or phosphorus because the wide melt interval of the alloy leads to considerable demixing. If the proportion of boron or phosphorus is too high, boron or phosphorus is burnt unnecessarily, on the one hand, leading to the further disadvantage, in addition to the increased consumption, of the effort involved in removing this element also increasing unnecessarily. With a concentration above 10% by weight and with a rising boron or phosphorus content, the disadvantages in the form of the high consumption of boron or phosphorus, and the increasing effort to remove them, must be considered in relation to the constantly decreasing advantage of the reduction in the melting point even in the case of compositions that have not reached a eutectic until then.

The reduction of the melting point according to the invention is particularly marked in the case of platinum, iridium and their alloys. The use of boron to reduce the melting point is preferred since greater safety measures have to be taken in general when using phosphorus.

According to the invention, fibers having a diameter of between 10 and 200 μm, in particular between 50 and 100 μm, are obtainable. Drawing fibers from the melt, in particular by melt extraction, according to the invention saves energy by reducing the melting temperature by boron or phosphorus and is gentler on the equipment, particularly in comparison with the effort involved without melting point reduction or in comparison with the effort involved in the production of wire sections. By reducing the melting point according to the invention, it is possible to produce the fibers also by a wire casting process according to German published patent application DE 197 57 093 A1 or a melt spin process according to German published patent application DE 31 36 303 A1.

DETAILED DESCRIPTION OF THE INVENTION

According to the invention, apart from the simplified fiber production by drawing from the melt, in particular by melt extraction, the sinter temperature and time necessary for the production of nettings or non-wovens from the fibers is also reduced, without the catalytic and mechanical properties of the non-wovens being negatively affected, since both boron and phosphorus are largely removed again before the use of the fibers, non-wovens or nettings as intended. The removal of boron and phosphorus takes place partly during drawing of the fibers and during sintering of the fibers to form nettings or non-wovens. An excessively high residual content of boron or phosphorus negatively affects the desired properties for application as catalyst.

It has proved to be particularly successful for removing the boron or phosphorus to heat the product, after sintering of the fibers to form nettings or non-wovens, for a few minutes to white heat. During such a treatment step, the strength of the material increases, while the boron or phosphorus content is reduced. It is assumed that boron or phosphorus remains above the usual contaminants by these elements, in particular at between 1 and 500 ppm. When boron is reduced to 1 to 20% by weight or phosphorus to 5 to 20% by weight, in particular, no negative effects of these elements on the catalytic action and mechanical stability of the fibers, nettings or non-wovens produced according to the invention need be expected.

When using non-noble alloy elements or metals of the platinum group sensitive to oxidation, such as iridium and ruthenium, the oxidation of the boron and/or phosphorus does not take place in an air atmosphere but under less severe conditions, such as in an oxidizing gas mixture containing $H_2/H_2O$. This gentle method is advantageous in particular for pre-sintering, if metals sensitive to oxidation are contained in the alloy.

In the following, the present invention is illustrated by way of examples. By adding approx. 2% by weight of boron to platinum, the melting point can be reduced from 1770° C. to 790° C. This facilitates the production of fibers from Pt alloys, such as PtRh5, by the melt extraction process. The melting point of Pd is reduced in a similar way from 1555° C. to 1065° C. by additionally alloying with approx. 3% by weight of B.

The PtRh5 fibers alloyed with boron are pre-sintered at a temperature (e.g. of 750° C.) just below the eutectic. The boron is oxidized during pre-sintering, and the boron oxide formed is largely liquefied or evaporated. Also, first sintered compounds are formed between the fibers. By a brief sintering treatment (lasting a few minutes) at a temperature in the region of 1200° C.-1400° C. (e.g. using a flame), the non-woven material is firmly sintered together. Traces of boron oxide, which may remain, can be eliminated by rinsing in warm water.

Non-wovens of palladium alloys can be produced in an analogous manner. Since, however, the eutectic of the Pd-B system of 1065° C. is substantially higher and/or the melting point of Pd of 1555° C. is substantially lower than that of platinum, greater care is required when adjusting the temperature for pre-sintering and sintering. However, the temperatures which are suitable can be easily determined by simple age hardening tests and subsequent metallographic examination of the micrograph.

PRACTICAL EXAMPLE 5 kg of a PtRh5 alloy pre-melted in a conventional manner were rolled, after casting, to form a rod having a diameter of 10 mm and cut into lengths of approximately 30 mm. The sections were subsequently heated slowly by induction in a zirconium oxide crucible, while being blanketed with argon, 2.1% by weight of boron granules—corresponding to the Pt-B eutectic—being added to the melt. After brief melting, a temperature increase of the melt to above 1000° C. was carefully avoided, in order to reduce the risk of a reaction between the boron and zirconium oxide in the crucible to a minimum. The alloy thus produced was cast in copper ingot molds to form ingots of approximately 20 mm×20 mm×120 mm.

The prepared ingots of B-containing PtRh5 alloy were melted in a zirconium oxide crucible in a melt extraction device (compare description in DE 199 45 742 C1, column 2, from line 40 onwards) under an argon blanketing atmosphere, while the temperature of the melt bath was kept in the region of 820-860° C. Comparative tests for the production of fibers from the alloy PtRh5 without boron failed as a result of the high melting temperature of the alloy (liquidus temperature approx. 1820° C.) and the damage thus caused to the melt crucible. The extraction process was adjusted by preliminary tests in such a way that 2.6 kg of fibers having a diameter of 50-60 µm and an average length of 5 mm were produced from the PtRh5-B alloy.

In line with the process described in DE 197 12 625 A1, the fibers were scattered onto a level substrate of aluminium oxide having the dimensions 400 mm×800 mm until the mass per unit area of the fibers reached 1500 g/m².

The non-woven material thus laid was introduced on the substrate into a chamber furnace under an air atmosphere, heated to 750° C. and kept at this temperature for 5 hours. The boron diffused from the fibers, oxidized at the surface of the PtRh alloy and formed boron oxide, which is liquid at this temperature (melting point 450° C.). The substrate with the pre-sintered non-woven material was removed from the oven and cooled to room temperature. After cooling, it was possible to dissolve the boron oxide in warm water, as a result of which the non-woven material detached itself from the substrate.

As a result of pre-sintering, an adequate mechanical strength for hanging up the non-woven material with platinum wire had already been achieved. At this stage, however, the non-woven material was still very fragile and had to be handled with great care. The non-woven material was heated with a hydrogen-oxygen flame to incandescence (roughly approximately 1200° C.) and kept at this temperature for 2-3 minutes. Following this treatment, the strength had increased considerably. The strength was determined by firmly stretching a circular non-woven blank (diameter 95 mm) around the circumference and pressing a steel hemisphere (diameter 40 mm) into it until the non-woven material broke. The maximum force reached was measured as being 95 N. In comparison, two non-wovens were tested which had been produced by laying and sintering from drawn PtRh5 wires and which also had a mass per unit area of 1500 g/mm². The first non-woven material was sintered for 10 min at 1640° C. in the oven and had a compression strength of 10 N. The second non-woven material was sintered for 12 hr at 1350° C. and had a compression strength of 85 N. The non-woven material according to the invention could be handled without problems. The boron content of the PtRh5 alloy had decreased to <0.001%. The non-woven material had a porosity of 91%.

Four circular blanks having a mass per unit area of 1500 g/m² and diameters of 62 mm each were cut from the non-woven material. The circular blanks were tested in a test reactor for the oxidation of ammonia to nitrogen oxide under a load of 22.4 tonnes nitrogen per square meter and day (t N/m²/d), a pressure of 3.5 bar and a temperature of 860° C. In comparison, ten standard catalyst nettings, which had been produced by weaving 76 µm wires of PtRh5 and had a mass per unit area of 600 g/m² each, were tested in a parallel reactor.

The pressure losses from the non-wovens were higher by a factor of 1.4 than in the case of the nettings, the concentration of laughing gas in the product gas was comparable in the case of the non-wovens and the nettings. The oxidation efficiency of the non-wovens was 96.2% under the conditions tested and remained at this level during the entire test period of 126.0 hours. The oxidation efficiency of the netting was 96.0% at the beginning of the test and fell to 95.5% in the course of the test period.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for production of a non-woven fiber material or netting from a noble metal-based metal with up to 30% by weight of additional alloy metal, the process comprising reducing the melting point of the noble metal-based metal by at least 400° C. by additionally alloying with boron or phosphorous, drawing fibers from a melt of the boron or phosphorus alloyed noble metal-based metal, scattering the fibers onto a substrate, removing the boron or phosphorus from the fibers, and sintering the fibers to form a non-woven fiber material or netting.

2. The process according to claim 1, wherein the boron or phosphorus is alloyed with the noble metal-based metal by mixing with the noble metal-based metal under a protective gas atmosphere.

3. The process according to claim 2, wherein the boron or phosphorus is removed thermally as oxide.

* * * * *